United States Patent [19]

Oishi et al.

[11] 4,002,585
[45] Jan. 11, 1977

[54] PRINTING INK BINDER RESIN

[75] Inventors: Toshio Oishi, Nishinomiya; Satoru Yoshimoto, Higashiosaka; Hiroshi Sasaki, Nara, all of Japan

[73] Assignee: Arakawa Rinsan Kagaku Kogyo Kabushiki Kaisha, Osaka, Japan

[22] Filed: Nov. 7, 1975

[21] Appl. No.: 630,030

[30] Foreign Application Priority Data

Nov. 8, 1974 Japan ............................ 49-129430

[52] U.S. Cl. ............................ 260/25; 260/31.8 T; 260/47 R; 260/838; 260/873
[51] Int. Cl.$^2$ ........................................ C08L 91/00
[58] Field of Search ...... 260/25, 47 R, 838, 31.8 T, 260/836, 873

[56] References Cited

UNITED STATES PATENTS

| | | | |
|---|---|---|---|
| 1,623,901 | 4/1927 | Amann et al. | 260/25 |
| 2,861,966 | 11/1958 | Betts | 260/23.7 C |

*Primary Examiner*—Melvin I. Marquis
*Assistant Examiner*—W. E. Parker
*Attorney, Agent, or Firm*—Armstrong, Nikaido & Wegner

[57] ABSTRACT

Printing ink binders comprising a reaction product of (a) rosin, (b) $\alpha,\beta$-ethylenically unsaturated carboxylic acid-modified petroleum resin, (c) resol type phenol-formaldehyde pre-condensate and (d) polyhydric alcohol, which have an acid value of not more than 30, a softening point of not less than 140° C., a viscosity of a 33% by weight linseed oil solution of not less than Y by Gardner-Holdt bubble viscometer at 25° C. and a tolerance to high-boiling aliphatic hydrocarbon of not less than 5. The reaction products have high softening point and high solubility to solvents, and are useful as binder resins for printing ink. The reaction products in the presence of cyclopentadiene polymer also provide excellent ink binders which have a higher softening point.

15 Claims, No Drawings

PRINTING INK BINDER RESIN

BACKGROUND OF THE INVENTION

The present invention relates to novel printing ink binder resins, and more particularly to resinous products having a high softening point and high solubility to solvent useful for offset or letterpress ink binders.

A printing ink, especially an offset printing ink is generally required to have the following fundamental properties.

1. Values indicating the flow property, such as viscosity and yield value are adequate.
2. Interfacial balance between a damping water and an ink is maintained so that the ink can keep on the image areas of a plate.
3. A pigment is well dispersed.
4. Gloss of printed surfaces is good.
5. Setting and drying are quick and blocking does not take place.
6. Abrasion resistance of printed surfaces are good.

For giving the above properties to the printing ink, the following requirements are necessary for a resin used as a binder of printing ink.

1. Solubility to a high-boiling hydrocarbon solvent and drying oil is enough.
2. Softening point is high and viscosity of the obtained varnish is high.
3. A functional group is temperately present.
4. Color is light color.

Hitherto, varnishes for offset printing ink are generally prepared by dissolving a resin such as alkylphenol resins, rosin-modified phenol resins or ester gum in a high-boiling solvent such as aliphatic hydrocarbons having a boiling point of 240° to 330° C. and an aniline point of 65° to 100° C. and/or a drying oil such as linseed oil, tung oil, dehydrated castor oil or safflower oil, and such varnishes are widely employed. In recent year, the printing speed becomes higher and, therefore, printing inks applicable to high-speed printing and capable of providing excellent gloss are desired. According to these desires, various binders for printing ink are proposed. One of them is a rosin type resin and it is considered to be suitable for the resin used as a binder of offset printing inks. However, these binders are not necessarily satisfactory. Other resins as a binder proposed have also the disadvantages. For instance, Japanese Patent Publication No. 27,492/1971 discloses a resin prepared by reacting a petroleum resin having a softening point of 58° C. with a phenol-formaldehyde pre-condensate in the presence of maleic anhydride and a esterification product of the resin with glycerin. However, since the softening points of these resins are low, the viscosity of the varnish prepared therefrom is low. Also the solubility of these resins to a high-boiling aliphatic hydrocarbon solvent is poor, and moreover the resins are unsuitable as a binder for light color printing ink since they are colored. It is also proposed in Japanese Patent Public Disclosure No. 24,405/1972 to use a binder resin prepared by reacting a maleic acid-modified cyclopentadiene polymer, a higher fatty acid and a polyhydric alcohol. Printing inks prepared from the resin have the disadvantages that the setting time is long due to low softening point of the resin and the gloss is insufficient. Japanese Patent Public Disclosure No. 82,405/1974 discloses a binder resin prepared by reacting a heat-polymerized cyclopentadiene modified with maleic acid with a phenol-formaldehyde pre-condensate. Such a binder resin is also unsatisfactory because the setting time is long and the gloss is poor.

OBJECTS OF THE INVENTION

It is an object of the present invention to provide a novel printing ink resin used as a binder.

A further object of the invention is to provide the binder resin having a high softening point and high solubility.

A still further object of the invention is to provide the binder capable of giving excellent offset or letterpress printing inks which enable quick drying due to short setting time, can give high gloss in printing and are stable on storage.

These and other objects of the invention will become apparent from the description hereinafter.

DETAILED DESCRIPTION

It has now been found that the above-mentioned objects can be attained by employing as a binder resin a reaction product of a rosin, an $\alpha,\beta$-ethylenically unsaturated carboxylic acid-modified petroleum resin, a resol-type phenol-formaldehyde pre-condensate and a polyhydric alcohol, which has a high softening point and high solubility to a solvent for offset printing ink, and also has been found that the softening point of the binder resin can be further increased by reacting the above-mentioned ingredients in the presence of a heat-polymerized cyclopentadiene polymer.

The binder resin of the present invention is a resin obtained by combining the rosin, which is modified with the resol type phenol-formaldehyde pre-condensate, and $\alpha,\beta$-ethylenically unsaturated carboxylic acid-modified petroleum resin, which is modified with the resol type phenol-formaldehyde pre-condensate, through the polyhydric alcohol, and has an acid value of not more than 30 and preferably not more than 25, a tolerance to a high-boiling aliphatic hydrocarbon solvent of not less than 5 and preferably not less than 8, a softening point of not less than 140° C. and preferably not less than 155° C., and a viscosity of a 33% by weight linseed oil solution of not less than Y and preferably not less than Z, by a Gardner-Holdt bubble viscometer at 25° C. (hereinafter referred to as "33% linseed oil viscosity").

The term "tolerance" as used herein means the solubility of the binder resin to a high-boiling aliphatic hydrocarbon solvent, and shows the value measured as follows: In two parts by weight of a hydrocarbon solvent (commercially available under the name "No. 5 SOLVENT" made by Nippon Oil Company, Ltd.) having an initial boiling point of 278° C., end boiling point of 312° C. and aniline point of 73° C., one part by weight of the binder resin was completely dissolved, and then to the resulting solution the solvent was added at a temperature of 20° C. with agitation until the solution becomes cloudy. The weight ratio of the solvent to the binder resin at that point is represented as the value of the tolerance.

Also the term 33% linseed oil viscosity as used herein means the viscosity of a solution of 1.0 part by weight of the binder resin in 2.0 parts by weight of linseed oil measured by a Gardner-Holdt bubble viscometer at a temperature of 25° C.

The resin having the physical properties within the above-mentioned range shows excellent effects as the binder for offset or letterpress printing inks. When the acid value is more than 30, the interfacial balance in printing is lost and the storage property becomes worse because the hydrophilic property of the binder resin becomes too excess. Also when the tolerance is less than 5, the setting time becomes long and a set-off may take place. The higher the softening point, the better but when it is less than 140° C., the drying becomes slow and blocking may take place and also the abrasion resistance of printed surfaces becomes worse. Also when the 33% linseed oil viscosity is less than Y, the gloss is poor and the setting time becomes long.

The binder resins of the present invention can be readily prepared by thermally reacting the rosin, $\alpha,\beta$-ethylenically unsaturated carboxylic acid-modified petroleum resin, resol-type phenol-formaldehyde pre-condensate and polyhydric alcohol in the absence of or in the presence of the cyclopentadiene polymer in various manners. For instance, the preparation of the binder resin may be carried out by simultaneously reacting all of the above components at a temperature of 200° to 290° C. for 2 to 30 hours, or by reacting the rosin, $\alpha,\beta$-ethylenically unsaturated carboxylic acid-modified petroleum resin and polyhydric alcohol, and if desired in the presence of the cyclopentadiene polymer, at a temperature of 200° to 290° C. for 2 to 30 hours and then reacting the resulting reaction product with the resol-type phenol-formaldehyde pre-condensate at a temperature of 150° to 250° C. for 1 to 10 hours. Usually, in the light of the easinesses of controlling the reaction and of preparing a desired product, the preparation is advantageously carried out by addition-reacting the rosin and $\alpha,\beta$-ethylenically unsaturated carboxylic acid-modified petroleum resin, and if desired, in the coexistence of the cyclopentadiene polymer, with the resol-type phenol-formaldehyde precondensate at a temperature of 150° to 250° C., preferably 180° to 240° C., for 1 to 10 hours in such a manner as adding dropwise or at intervals the pre-condensate to avoid the condensation of the pre-condensate per se and then subjecting the resulting reaction product to esterification reaction with the polyhydric alcohol at a temperature of 200° to 290° C., preferably 230° to 280° C., for 2 to 30 hours.

As the rosin, any rosins such as gum rosin, wood rosin, tall-oil rosin, partially polymerized rosin and partially hydrogenated rosin can be employed in the present invention.

According to the present invention, it is necessary that the $\alpha,\beta$-ethylenically unsaturated carboxylic acid-modified petroleum resin has an acid value of 10 to 60, preferably 15 to 30, a bromine value of 20 to 50, preferably 20 to 30, and a softening point of 85° to 170° C., preferably 100° to 130° C. Any carboxylic acid-modified petroleum resins having the physical properties within the above range can be employed in the present invention. The carboxylic acid-modified petroleum resin having an acid value of less than 10 combines with the rosin through the condensation with the polyhydric alcohol with difficulty and, therefore, the binder resin having a desired softening point is hard to obtain and the setting time and gloss of the ink become unsatisfactory. Also the use of the carboxylic acid-modified petroleum resin having an acid value of more than 60 is undesirable, because the molecular weight of the reaction product in the condensation reaction becomes too high or the acid value of the obtained binder resin becomes too high due to the large amount of the residual carboxyl group. Further, when the carboxylic acid-modified petroleum resin has a bromine value of less than 20, the reaction with the phenol-formaldehyde pre-condensate does not sufficiently proceed and it is difficult to raise the softening point. Also when the bromine value is more than 50, the produced binder resin is remarkably colored and can not be employed as a binder for light color ink. The amount of the $\alpha,\beta$-ethylenically unsaturated carboxylic acid-modified petroleum resin is selected from 5 to 300 parts by weight, preferably 20 to 250 parts by weight, per 100 parts by weight of the rosin. When the amount is less than 5 parts by weight, the tolerance of the produced binder resin is not enough. Also when the amount is more than 300 parts by weight, the produced binder resin is remarkably colored and also the obtained ink is unstable on storage and is unsatisfactory in the interfacial balance in printing.

The $\alpha,\beta$-ethylecinally unsaturated carboxylic acid-modified petroleum resins employed in the present invention are prepared by a known process. Distillates at −20° to 280° C. by-produced in cracking or purifying petroleum contain large quantities of olefins and diolefins. From fractions of the above distillates, various petroleum resins are obtained generally by cationic-polymerizing a fraction in the presence of a catalyst such as aluminum chloride, aluminum bromide, boron trifluoride, its complexes with an ether or phenol, tin tetrachloride, zinc chloride, or titanium tetrachloride at a temperature of −20° to 100° C. In the present invention, petroleum resins having a bromine value of 20 to 50 and a softening point 85° to 160° C. are selected from the so prepared petroleum resins and are modified with an $\alpha,\beta$-ethylenically unsaturated carboxylic acid such as acrylic acid, maleic acid, fumalic acid, itaconic acid, citraconic acid or anhydrides thereof in a known manner. Usually, the carboxylic acid is employed in an amount of 1 to 10% by weight to the petroleum resin, and the modification is carried out at a temperature of 150° to 250° C. for 1 to 5 hours. In the present invention, since the so modified petroleum resin is reacted with the phenol-formaldehyde pre-condensate, petroleum resins whose degree of unsaturation is high, namely the so-called $C_5$ petroleum resins obtainable from a petroleum distillate containing a large quantity of $C_5$ diolefins having a boiling point of 20° to 100° C., especially 30° to 45° C. are preferably employed as the starting material of the carboxylic acid-modified petroleum resin.

The pre-condensate of resol-type phenols and formaldehyde employed in the present invention can be prepared by a known process. In general, the pre-condensate is prepared by reacting a phenol and formaldehyde in the presence of an alkaline catalyst such as sodium hydroxide, potassium hydroxide, magnesium hydroxide or calcium hydroxide at a temperature of 50° to 100° C. for 3 to 5 hours. The so prepared pre-condensate is a semi solid material at a room temperature and mainly comprises a dimethylolphenol. In some cases, (alkyl)methylolhydroxybenzyl ether is further contained. As the phenol, phenol, cresol, butylphenol, amylphenol, octylphenol, phenylphenol and bisphenols can be employed. The pre-condensates on the market as mentioned above are of course usable in the invention. The resol-type phenol-formaldehyde pre-condensate is employed in an amount of 20 to 80 parts by weight, preferably 30 to 60 parts by weight, per 100 parts by weight of the rosin. When the amount is less than 20 parts by weight, the softening point of the produced binder resin and the viscosity of the ink prepared therefrom are low and, therefore, the setting time becomes long and moreover the gloss becomes worse. Also the use of the pre-condensate in an amount of more than 80 parts by weight is undesirable, because the main reaction is the condensation reaction of the pre-condensate per se rather than the reaction of the pre-condensate with the rosin and $\alpha,\beta$-ethylenically unsaturated carboxylic acid-modified petroleum resin and, therefore, the produced resin is noticeably colored and also the viscosity of the ink prepared therefrom becomes too high. The pre-condensates of formaldehyde and a p-alkylphenol such as p-t-butylphenol, p-t-amylphenol or p-octylphenol give the binder resins excellent in tolerance and gloss, and are preferably employed in the invention.

Examples of the polyhydric alcohol employed in the present invention are ethylene glycol, diethylene glycol, propylene glycol, neopentyl glycol, glycerin, trimethylolethane, trimethylolpropane, pentaerythritol, dipentaerythritol, and the like, and especially tri and more hydric alcohols are preferably employed. The polyhydric alcohol may, of course, be employed in a form of mixture thereof. The amount of the polyhydric alcohol is selected to produce the reaction product containing as little carboxyl and hydroxyl group as possible. Usually, the polyhydric alcohol is employed in an amount of 0.6 to 1.2 equivalents, preferably 0.8 to 1.1 equivalents, of —OH group per equivalent of —COOH group in both rosin and $\alpha,\beta$-ethylenically unsaturated carboxylic acid-modified petroleum resin.

According to the present invention, the use of the cyclopentadiene polymer in the reaction for preparing the binder resin is useful for increasing the softening point of the binder resin. The cyclopentadiene polymer is employed in an amount of 10 to 100 parts by weight, preferably 20 to 80 parts by weight, per 100 parts by weight of the rosin. When the amount is more than 100 parts by weight, the produced binder resin is noticeably colored and moreover the preparation of the binder resin is difficult because the softening point becomes too high. The cyclopentadiene polymer is the solvent-soluble resin having a softening point of 50° to 150° C. known in the art. For instance, it is prepared by heat-polymerizing cyclopentadiene and/or methylcyclopentadiene at a temperature of 250° to 300° C., as disclosed in U.S. Pat. No. 3,084,147.

The reaction product according to the invention can be utilized as the binder resin for offset, letterpress or gravure inks in a conventional manner. In general a varnish is prepared by dissolving 100 parts by weight of the binder resin of the invention in 80 to 200 parts by weight of a solvent consisting of a drying oil and/or a high-boiling petroleum solvent at a room temperature or under heating. As the high-boiling petroleum solvent, a hydrocarbon solvent having a boiling point of 240° to 300° C. and aniline point of 65° to 100° C., which mainly consists of an aliphatic hydrocarbon, is generally employed. Offset printing inks are prepared by blending the varnish with various pigments in a usual manner.

The present invention is more specifically described and explained by means of the following Examples, in which all parts and percentages are by weight except as noted.

In Examples, resol-type phenol-formaldehyde pre-condensates employed are those prepared by reacting an alkylphenol with formaldehyde in the molar ratio of 1 : 2.

EXAMPLE 1

A one liter four necked flask equipped with a stirrer, thermometer, dropping funnel and reflux condenser was charged with 240 g. of gum rosin, 60 g. of maleic anhydride-modified petroleum resin having an acid value of 20.0, a bromine value of 28 and a softening point of 118° C. which was prepared by reacting 100 parts of a petroleum resin (commercially available under the trademark "Hi-rez C-110X" made by Mitsui Petrochemical Industries, Ltd.) with 3.5 parts of maleic anhydride, and 3 g. of maleic anhydride, and temperature was elevated to 220° C. At this temperature, 200 g. of resol-type p-octylphenol-formaldehyde pre-condensate (non-volatile material content: 60%) was added dropwise to the flask for 2 hours with agitation. After the completion of the dropping, the agitation was further continued at 220° C. for 30 minutes. To the flask, 25.5 g. of pentaerythritol was added and the temperature was gradually elevated to 270° C. during 2 hours. Removing water produced, the reaction was then conducted at a temperature of 260° to 270° C. for 12 hours with agitation. After the completion of the reaction, volatile materials were removed under a reduced pressure to give 400 g. of binder resin having an acid value of 18, softening point of 165° C., 33% linseed oil viscosity of $Z_4$ and tolerance of 10.

The acid value was measured in accordance with the provision of Japanese Industrial Standard K 5902.

The softening point was measured in accordance with the provision of Japanese Industrial Standard K 2531.

The bromine value was measured in accordance with the provision of ASTM D 1158-57T.

EXAMPLE 2

A one liter four necked flask equipped with a stirrer, thermometer, dropping funnel and reflux condenser was charged with 240 g. of gum rosin and 90 g. of maleic anhydride-modified petroleum resin having an acid value of 18, a bromine value of 30 and a softening point of 105° C. which was prepared by reacting 100 parts of a petroleum resin (commercially available under the trademark "Escorez 1102B" made by Esso Standard Oil Co., Ltd.) with 3 parts of maleic anhydride, and temperature was elevated to 220° C. At this temperature, 200 g. of resol-type p-octylphenolformaldehyde pre-condensate (non-volatile material content: 60%) was added dropwise to the flask for 2 hours with agitation, and after the completion of the dropping, the agitation was further continued at 220° C. for 30 minutes. Then to the flask, 25.5 g. of pentaerythritol was added and the temperature was gradually elevated to 270° C. during 2 hours. Removing water produced, the esterification reaction was then carried out at a temperature of 260° to 270° C. for 12 hours with agitation. After the completion of the reaction, low-boiling materials were removed by reduced pressure distillation to give 400 g. of binder resin having an acid value of 19, softening point of 170° C., 33% linseed oil viscosity of $Z_3$ and tolerance of not less than 15.

EXAMPLE 3

The same procedure as in Example 2 was repeated except that 240 g. of gum rosin, 60 g. of maleic acid-modified petroleum resin having an acid value of 28, a bromine value of 29 and a softening point of 160° C. (commercially available under the trademark "Nisseki Neopolymer 160" made by Nippon Petrochemicals Co., Ltd.), 200 g. of resoltype p-octylphenol-formaldehyde pre-condensate (non-volatile material content: 60%) and 27 g. of pentaerythritol were employed, to give 410 g. of binder resin having an acid value of 17, softening point of 155° C., 33% linseed oil viscosity of $Z_1$ and tolerance of not less than 15.

EXAMPLE 4

The same procedure as in Example 2 was repeated except that 180 g. of gum rosin, 120 g. of maleic anhydride-modified $C_5$ petroleum resin which was prepared by reacting 100 parts of a petroleum resin (commercially available under the trademark "Quintone A-100" made by Nippon Zeon Co., Ltd.) with 3 parts of maleic anhydride, 200 g. of resol-type p-octylphenol-formaldehyde pre-condensate (non-volatile material content: 60%) and 21 g. of pentaerythritol, to give 405 g. of binder resin having an acid value of 17, softening point of 170° C., 33% linseed oil viscosity of $Z_3$ and tolerance of not less than 15.

EXAMPLE 5

A one liter four necked flask equipped with a stirrer, thermometer, dropping funnel and reflux condenser was charged with 150 g. of gum rosin, 105 g. of maleic anhydride-modified $C_5$ petroleum resin having an acid value of 30, bromine balue of 26.5 and softening point of 120° C. which was prepared by reacting 100 parts of a petroleum resin (commercially available under the trademark "Hi-rez C-110X" made by Mitsui Petrochemical Industries, Ltd.) with 5 parts of maleic anhydride, and 45 g. of cyclopentadiene polymer having a softening point of 80° C. and a bromine value of 85. After elevating the temperature to 220° C., at this temperature 100 g. of resol-type p-octylphenol-formaldehyde pre-condensate (nonvolatile material content: 60%) was added dropwise to the flask for 2 hours with agitation. Further 12 g. of glycerin was added to the flask and the reaction was then carried out at a temperature of 230° to 250° C. for 6 hours. After the completion of the reaction, unreacted and low-boiling materials were removed by reduced pressure distillation to give 350 g. of binder resin having an acid value of 14, softening point of 175° C., 33% linseed oil viscosity of $Z_4$ and tolerance of not less than 15.

EXAMPLE 6

A one liter four necked flask equipped with a stirrer, thermometer, dropping funnel and reflux condenser was charged with 100 g. of gum rosin and 230 g. of maleic anhydride-modified petroleum resin having an acid value of 20, bromine value of 28 and softening point of 118° C. which was prepared by reacting 100 parts of a petroleum resin (commercially available under the trademark "Hi-rez C-100X" made by Mitsui Petrochemical Industries, Ltd.) with 3.5 parts of maleic anhydride. After the content was melted by elevating the temperature to 220° C., at this temperature, 94 g. of resol-type p-octylphenol-formaldehyde pre-condensate (non-volatile material content: 60%) was added dropwise to the flask for 2 hours with agitation. After the completion of the dropping, the agitation was further continued at 220° C. for 30 minutes. Then 16 g. of pentaerythritol was added to the flask and the temperature was elevated to 270° C. At this temperature, the reaction was carried out for 12 hours with removing water produced. The obtained binder resin had an acid value of 18, softening point of 165° C., 33% linseed oil viscosity of $Z_4$ and tolerance of 10.

EXAMPLE 7

A one liter four necked flask equipped with a stirrer, thermometer, dropping funnel and reflux condenser was charged with 100 g. of wood rosin, 230 g. of maleic anhydride-modified petroleum resin employed in Example 1, 94 g. of resol-type p-octylphenol-formaldehyde pre-condensate (non-volatile material content: 60%) and 16 g. of pentaerythritol. After gradually elevating temperature to 150° C. during one hour with agitation, the content was further maintained at a temperature of 150° to 160° C. for one hour. Then the temperature was gradually elevated to 260° C. during 1 hour, and the reaction was carried out at a temperature of 260° to 270° C. for 8 hours with agitation.

The thus obtained binder resin had an acid value of 17, softening point of 158, tolerance of not less than 15 and 33% linseed oil viscosity of $Z_3$.

EXAMPLE 8

The same procedure as in Example 2 was repeated except that 200 g. of tall-oil rosin, 200 g. of maleic anhydride-modified petroleum resin employed in Example 2, 120 g. of resol-type p-t-amylphenol-formaldehyde precondensate (non-volatile material content: 60%), 12 g. of glycerin and 13 g. of pentaerythritol were employed and the esterification reaction was carried out at a temperature of 260° to 270° C. for 14 hours.

The thus obtained binder resin had an acid value of 16, softening point of 157° C., 33% linseed oil viscosity of $Z_2$ and tolerance of not less than 15.

EXAMPLE 9

The same procedure as in Example 2 was repeated except that 200 g. of gum rosin, 100 g. of maleic anhydride-modified petroleum resin employed in Example 5, 75 g. of p-t-butylphenol-formaldehyde pre-condensate (non-volatile material content: 60%), 75 g. of p-octylphenol-formaldehyde pre-condensate (non-volatile material content: 60%) and 20 g. of glycerin were employed and the esterification reaction was carried out at a temperature of 260° to 270° C. for 14 hours.

The thus obtained binder resin had an acid value of 22, softening point of 163° C., 33% linseed oil viscosity of $Z_2$ and tolerance of 12.

EXAMPLE 10

The same procedure as in Example 7 was repeated except that 100 g. of tall-oil rosin, 200 g. of maleic anhydride-modified petroleum resin employed in Example 1, 80 g. of p-octylphenol-formaldehyde pre-condensate (non-volatile material content: 60%), 13.8 g. of pentaerythritol and 50 g. of cyclopentadiene polymer having a softening point of 80° C. and bromine value of 85 were employed.

The thus obtained binder resin had an acid value of 16, softening point of 161° C., 33% linseed oil viscosity of $Z_3$ and tolerance of not less than 15.

EXAMPLE 11

A one liter four necked flask equipped with a stirrer, thermometer, dropping funnel and reflux condenser was charged with 200 g. of wood rosin, 60 g. of maleic anhydride-modified petroleum resin employed in Example 5 and 140 g. of cyclopentadiene polymer having a softening point of 80° C. and bromine value of 85. After elevating the temperature to 220° C., at this temperature 134 g. of resol-type p-t-butylphenol-formaldehyde pre-condensate (non-volatile material content: 60%) was added dropwise to the flask for 2 hours with agitation. After the completion of the dropping, the agitation was further, continued at 220° C. for 30 minutes. Then 16 g. of glycerin was added to the flask, and after gradually elevating the temperature to 260° C. during 2 hours, the reaction was carried out at a temperature of 255° to 265° C. for 7 hours.

The thus obtained binder resin had an acid value of 20, softening point of 171° C., 33% linseed oil viscosity of $Z_4$ and tolerance of 14.

EXAMPLE 12

The same precedure as in Example 11 was repeated except that 100 g. of gum rosin, 139 g. of maleic anhydride-modified petroleum resin employed in Example 1, 90 g. of p-t-amylphenol-formaldehyde pre-condensate (non-volatile material content: 60%), 5 g. of glycerin, 5.5 g. of pentaerythritol and 39 g. of cyclopentadiene polymer having a softening point of 120° C. and bromine value of 95 were employed.

The thus obtained binder resin had an acid value of 17, softening point of 160° C., 33% linseed oil viscosity of $Z_2$ and tolerance of not less than 15.

COMPARATIVE EXAMPLE 1

A one liter four necked flask equipped with a stirrer, thermometer, dropping funnel and reflux condenser was charged with 200 g. of maleic anhydride-modified petroleum resin employed in Example 1, and the resin was melted by elevating temperature to 220° C. Then 83 g. of a resol-type phenol-formaldehyde pre-condensate (non-volatile material content: 60%) was added dropwise to the flask for 2 hours with agitation, and after the completion of the dropping, the agitation was further continued at the same temperature for 30 minutes. Then to the flask, 4.4 g. of glycerin was added and the temperature was elevated to 260° C. At this temperature, the reaction was carried out for 3 hours.

The thus obtained resin had an acid value of 15, softening point of 140° C., 33% linseed oil viscosity of Z and tolerance of less than 2.

COMPARATIVE EXAMPLE 2

A one liter four necked flask was charged with 100 g. of gum rosin and 25 g. of a petroleum resin having a softening point of 110° C. and bromine value of 30 (commercially available under the trademark "Hi-rez C-110X" made by Mitsui Petrochemical Industries, Ltd.). After melting the content by elevating temperature to 220° C., 83 g. of resol-type p-octylphenol-formaldehyde precondensate (non-volatile material content: 60%) was added dropwise to the flask for 2 hours with agitation. Then the temperature was elevated to 270° C., and 10.6 g. of pentaerythritol was added to the flask. The reaction was carried out at 270° C. for 13 hours. After the completion of the reaction, volatile materials were removed by reduced pressure distillation to give a resin having an acid value of 18, softening point of 150° C., 33% linseed oil viscosity of $Z_1$ and tolerance of 12.

COMPARATIVE EXAMPLE 3

A one liter four necked flask was charged with 300 . of a petroleum resin having a softening point of 60° C. and bromine value of 55, 12 g. of maleic anhydride and 100 g. of a phenol-formaldehyde pre-condensate. The reaction was carried out, first at a temperature of 190° C. for 30 minutes, and then at a temperature of 200° C. for 2 hours, and further at a temperature of 220° C. for 30 minutes. After the completion of the reaction, volatile materials were removed under a reduced pressure to give a resin having an acid value of 17, softening point of 121° C., 33% linseed oil viscosity of $Z_2$ and tolerance of less than 2.

COMPARATIVE EXAMPLE 4

A one liter four necked flask was charged with 100 g. of cyclopentadiene polymer having a softening point of 120° C. and bromine value of 95 and 6 g. of maleic anhydride. After reacting at a temperature of 200° C. for 1 hour, 83 g. of resol-type p-octylphenol-formaldehyde pre-condensate (non-volatile material content: 60%) was added dropwise to the flask for 2 hours at the same temperature with agitation and the agitation was further continued for 30 minutes.

The thus obtained resin had an acid value of 20, softening point of 187° C., 33% linseed oil viscosity of $Z_2$ and tolerance of not less than 15.

COMPARATIVE EXAMPLE 5

A one liter four necked flask was charged with 200 g. of gum rosin and 100 g. of cyclopentadiene polymer having a softening point of 80° C. and bromine value of 85. After elevating temperature to 220° C., at this temperature 100 g. of resol-type p-octylphenol-formaldehyde pre-condensate (non-volatile material content: 60%) was added dropwise to the flask for 2 hours with agitation. After the completion of the dropping, the agitation was further continued at 220° C. for 30 minutes. Then to the flask, 18 g. of glycerin was gradually added during 2 hours, and after elevating the temperature to 260° C., the reaction was carried out at a temperature of 255° to 265° C. for 8 hours.

The thus obtained resin had an acid value of 18, softening point of 170° C., 33% linseed oil viscosity of $Z_2$ and tolerance of 8.

Testing of the binder resins so prepared was carried out as follows:

Employing each of the binder resins obtained in Examples 1 to 12, Comparative Examples 1 to 5 and a rosin-modified phenol resin on the market as a binder resin (commercially available under the registered trademark "Tamanol 350" made by Arakawa Rinsan Kagaku Kogyo Kabushiki Kaisha) which has a softening point of 172° C., acid value of 20, 33% linseed oil viscosity of $Z_4$ and tolerance of 4, a varnish was prepared by uniformly dissolving 50 g. of binder resin in 50 g. of a mixture consisting of 10 g. of linseed oil and 40 g. of a solvent for inks (commercially available under the name of "No. 5 solvent" made by Nippon Oil Company, Ltd.).

To the thus obtained varnish, the following additives were blended and milled by a three roll mill to prepare an offset ink.

| | |
|---|---|
| Varnish | 70 parts |
| Carmine 6B | 18 parts |

| | -continued | |
|---|---|---|
| No. 5 solvent | | 0 to 7 parts |
| Rub proof compound | | 3 parts |
| Ink drier (Speed King Drier made by Toyo Mfg. Co., Ltd.) | | 2 parts |

The amount of No. 5 solvent was selected within the above range so that the tack value and flow value were controlled to 12 ± 0.5 and 16 ± 0.5, respectively.

The tack value was measured by using Inko meter made by Kabushiki Kaisha Toyo Seiki Seisakusho at 400 r.p.m.

The flow value was measured by using Spread meter made by Kabushiki Kaisha Toyo Seiki Seisakusho and was indicated by a radius after one minute.

The storage stability, gloss and setting time of each offset ink so prepared were tested as follows:

a. Storage stability

The ink was kept in a sealed vessel at a room temperature for one week, and the stability was evaluated by difference between the flow values immediately after the preparation and after one week.

b. Gloss

A RI tester made by Kabushiki Kaisha Akira Seisakusho was charged with 0.4 ml. of the ink, and then an art paper was printed. After conditioning at a temperature of 20° C. and a relative humidity of 65% for 24 hours, the gloss on the printed face was measured by using a glossmeter at the angles of 60°—60° of regular reflectivity.

c. Setting time

A RI tester made by Kabushiki Kaisha Akira Seisakusho was charged with 0.4 ml. of the ink, and then an art paper was printed. An unprinted art paper was placed on the printed paper to the printed face, and then pressed by using a roller of RI tester. The transition of the ink on the printed paper to the virgin paper was observed and time until no transition was observed was measured.

The results of testing are shown in the following Table.

| Binder | Stability | Gloss | Setting time minute |
|---|---|---|---|
| Ex. 1 | 0.5 | 71 | 3 |
| Ex. 2 | 0.6 | 70 | 3 |
| Ex. 3 | 0.8 | 62 | 5 |
| Ex. 4 | 0.5 | 69 | 4 |
| Ex. 5 | 0.8 | 72 | 3 |
| Ex. 6 | 1.0 | 68 | 4 |
| Ex. 7 | 1.0 | 72 | 5 |
| Ex. 8 | 0.8 | 68 | 3 |
| Ex. 9 | 0.5 | 70 | 2 |
| Ex. 10 | 0.8 | 75 | 6 |
| Ex. 11 | 0.8 | 70 | 2 |
| Ex. 12 | 0.6 | 72 | 4 |
| Com. Ex. 1 | 2.0 | 48 | 15 |
| Com. Ex. 2 | 0.6 | 52 | 15 |
| Com. Ex. 3 | 2.5 | 40 | 20 |
| Com. Ex. 4 | 2.5 | 48 | 10 |
| Com. Ex. 5 | 1.7 | 57 | 18 |
| Rosin-modified phenol resin | 1.5 | 57 | 15 |

What we claim is:

1. A printing ink binder resin comprising a reaction product of (a) a rosin, (b) 5 to 300 parts of an α,β-ethylenically unsaturated carboxylic acid-modified petroleum resin having an acid value of 10 to 60, a bromine value of 20 to 50 and a softening point of 85° to 170° C., (c) 20 to 80 parts of a resol-type phenol-formaldehyde pre-condensate, and (d) a polyhydric alcohol, said reaction product having an acid value of not more than 30, a softening point of not less than 140° C., a viscosity of a 33% by weight linseed oil solution of not less than Y by a Gardner-Holdt bubble viscometer at 25° C. and a tolerance of not less than 5, said (d) being present in an amount of 0.6 to 1.2 equivalents of —OH group per equivalent of —COOH group in both said (a) and (b), and said parts of (b) and (c) being parts by weight per 100 parts of (a).

2. The binder resin of claim 1, wherein said reaction product is one prepared by reacting said (a) and (b) with said (c) at a temperature of 150° to 250° C. for 1 to 10 hours and then esterifying the resulting reaction product with said (d) at a temperature of 200° to 290° C. for 2 to 30 hours.

3. The binder resin of claim 1, wherein said reaction product has an acid value of not more than 25, a softening point of not less than 155° C., a viscosity of not less than $Z_1$ and a tolerance of not less than 8.

4. An offset ink binder resin comprising a reaction product of (a) a rosin, (b) 5 to 300 parts of an α,β-ethylenically unsaturated carboxylic acid-modified petroleum resin having an acid value of 10 to 60, a bromine value of 20 to 50 and a softening point of 85° to 170° C., (c) 20 to 80 parts of a resol-type phenol-formaldehyde pre-condensate, (d) a polyhydric alcohol, and (e) 10 to 100 parts of a cyclopentadiene polymer having a softening point of 50° to 150° C., said reaction product having an acid value of not more than 30, a softening point of not less than 140° C., a viscosity of a 33% by weight linseed oil solution of not less than Y by a Gardner-Holdt bubble viscometer at 25° C. and a tolerance of not less than 5, said (d) being present in an amount of 0.6 to 1.2 equivalents of —OH group per equivalent of —COOH group in both said (a) and (b), and said parts of (b), (c) and (e) being parts by weight per 100 parts of (a).

5. The binder resin of claim 4, wherein said reaction product is one prepared by reacting said (a), (b) and (e) with said (c) at a temperature of 150° to 250° C. for 1 to 10 hours and then esterifying the resulting reaction product with said (d) at a temperature of 200° to 290° C. for 2 to 30 hours.

6. The binder resin of claim 4, wherein each amount of said (b), (c) and (e) falls respectively within the range of 20 to 250 parts by weight, within the range of 30 to 60 parts by weight, and within the range of 20 to 80 parts by weight, per 100 parts by weight of said (a).

7. The binder resin of claim 4, wherein said reaction product has an acid value of not more than 25, a softening point of not less than 155° C., a viscosity of not less than $Z_1$ and a tolerance of not less than 8.

8. The binder resin of claim 4, wherein said (b) has an acid value of 15 to 30, a bromine value of 20 to 30 and a softening point of 100° to 130° C.

9. The binder resin of claim 4, wherein said (b) is a maleic anhydride-modified petroleum resin.

10. The binder resin of claim 9, wherein said maleic anhydride-modified petroleum resin is one prepared by subjecting a five-carbon-diolefin petroleum distillate to cationic polymerization and modifying the resulting petroleum resin with maleic anhydride.

11. The binder resin of claim 4, wherein said (c) is a resol-type pre-condensate of a p-alkylphenol and formaldehyde.

12. The binder resin of claim 11, wherein said p-alkylphenol is at least one member selected from the group consisting of p-t-butylphenol, p-t-amylphenol and p-octylphenol.

13. The binder resin of claim 4, wherein said (d) being present in an amount of 0.8 to 1.1 equivalents of —OH group per equivalent of —COOH group in both said (a) and (b).

14. The binder resin of claim 4, wherein said (d) is at least one member selected from the group consisting of trihydric alcohols and tetrahydric alcohols.

15. The binder resin of claim 4, wherein said (d) is at least one member selected from the group consisting of glycerin and pentaerythritol.

* * * * *